A. A. FREEMAN.
MANUFACTURE OF PLUMES.
No. 175,687. Patented April 4, 1876.
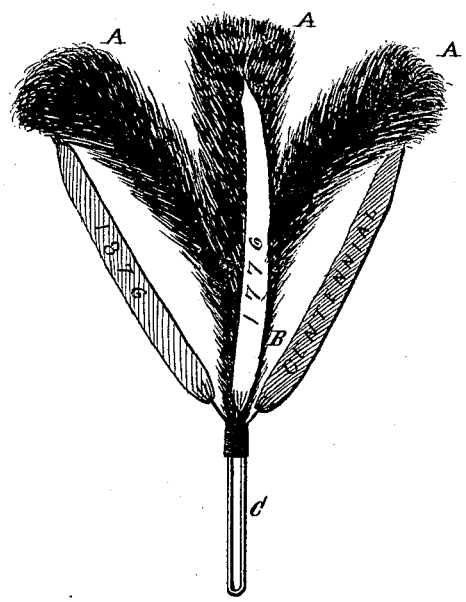
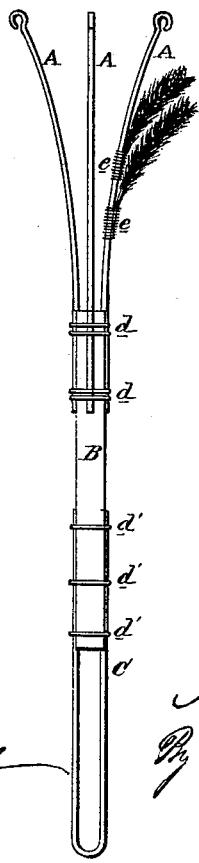
Witnesses.
Alexander K. Morgan
Chas. M. Morgan
Inventor.
Albert A. Freeman,
By Isaac R. Oakford,
Attorney.

UNITED STATES PATENT OFFICE.

ALBERT A. FREEMAN, OF PHILADELPHIA, PENNSYLVANIA, ASSIGNOR TO AMANDA GRIFFITHS, OF SAME PLACE.

IMPROVEMENT IN THE MANUFACTURE OF PLUMES.

Specification forming part of Letters Patent No. 175,687, dated April 4, 1876; application filed December 7, 1875.

*To all whom it may concern:*

Be it known that I, ALBERT A. FREEMAN, of the city and county of Philadelphia, State of Pennsylvania, have invented a new and useful Improvement in Plumes for Horses' Heads and Military Hats, which improvement is fully set forth in the following specification, reference being had to the accompanying drawings.

This invention relates to an improvement in plumes which are worn as an ornament on the head of a horse, or on a military hat, and are usually made with small feathers secured to a frame of whalebone. The object of my invention is to provide a frame light in weight and durable, having wire branches, to which the numerous feathers composing the plume are secured, and which will be sufficiently rigid, when curved outward at the upper ends, to remain at all times in a fixed position, thereby preserving the graceful form of the plume.

Figure 1 is a perspective view of my improvement in plumes. Fig. 2 is a perspective view of the frame to which the feathers are secured.

The plume shown in Fig. 1 of the drawing is intended for ornamenting a military hat, and is made, in this instance, with three branches, A A A, (although two or more may be employed,) curving outward from a single stem, B, with the feathers of one or various colors. The straight stem B, to which the branches A A A are secured, may be made of wire or other suitable material, of proper length and sufficient stiffness to prevent bending. The lower ends of the wires A A A are placed in grooves made to receive them in the stem B, and retained in position by means of rings $d\ d$ passed around them, or a flattened surface made on the stem for each wire and soldered together would answer the purpose of the grooves and rings. The upper ends of the wires A A A are turned over to form hooks for attaching ribbons, flags, or other devices to render the plume more attractive, as shown in Fig. 1 of the drawing.

In securing the feathers (which may be arranged in colors to suit the fancy) to the wires A A A and stem B, the central quill of each one is bound or tied, as shown at $e\ e$, Fig. 2. In this manner the stem and wires are completely covered and a beautiful appearance effected. A wire, C, bent to form a loop at the lower end for securing the plume in position, is attached to the lower part of the stem B by means of rings $d'\ d'\ d'$.

What I claim as my invention is—

In a frame for supporting the feathers of a plume, the combination of the curved-wire branches A A A with the straight stem B, and arranged to retain the feathers in a fixed position, substantially as shown and described.

ALBERT A. FREEMAN.

Witnesses:
ALEXANDER H. MORGAN,
ISAAC R. OAKFORD.